(12) United States Patent
Trane

(10) Patent No.: US 6,219,227 B1
(45) Date of Patent: Apr. 17, 2001

(54) PORTABLE COMPUTER ASSEMBLY

(76) Inventor: David Trane, 2041 Amethyst Dr., Longmont, CO (US) 80501

( * ) Notice: Subject to any disclaimer, the term of this patent is extended or adjusted under 35 U.S.C. 154(b) by 0 days.

(21) Appl. No.: 09/361,469

(22) Filed: Jul. 27, 1999

(51) Int. Cl.[7] .................................................. G06F 1/16
(52) U.S. Cl. ...................... 361/683; 361/684; 361/725; 312/223.2
(58) Field of Search .................................. 361/683, 680, 361/684, 724–727; 312/223.2, 223.3

(56) References Cited

U.S. PATENT DOCUMENTS

| | | | |
|---|---|---|---|
| 4,849,815 | 7/1989 | Streck | 379/100 |
| 5,216,441 | * 6/1993 | Isobe | 346/76 |
| 5,369,700 | 11/1994 | Koura et al. | 379/387 |
| 5,386,298 | * 1/1995 | Bronnenberg et al. | 358/403 |
| 5,531,527 | * 7/1996 | Maekawa et al. | 400/185 |
| 5,732,074 | 3/1998 | Spaur et al. | 370/313 |
| 5,799,067 | 8/1998 | Kikinis et al. | 379/93.06 |
| 5,799,068 | 8/1998 | Kikinis et al. | 379/93.06 |
| 5,802,483 | 9/1998 | Morris | 455/557 |
| 5,828,341 | * 10/1998 | Delamater | 343/702 |
| 5,983,073 | * 11/1999 | Ditzik | 455/556 |
| 6,049,450 | * 4/2000 | Cho et al. | 361/683 |

* cited by examiner

*Primary Examiner*—Leo P. Picard
*Assistant Examiner*—Hung Van Duong
(74) *Attorney, Agent, or Firm*—Emery L. Tracy

(57) ABSTRACT

A portable computer assembly is provided. The portable computer assembly comprises a main outer casing and an operable computer system mounted with the outer casing with the computer system being powered by a power source. A cover lid is hingedly connected to the main outer casing with the cover lid being rotatable in a direction generally toward the main outer casing and in a direction generally away from the main outer casing. A display device is mounted within the cover lid for displaying data generated by the computer system. A printer device is securable to the computer system for receiving individual sheets of paper from the paper supply means and printing data received from the computer system upon the individual sheets of paper and a paper feed mechanism feeds at least one sheet of paper into the printer device. A portable telephone is releasably secured to main outer casing and electrically connected to the computer system.

24 Claims, 6 Drawing Sheets

PORTABLE COMPUTER ASSEMBLY

BACKGROUND OF THE INVENTION

1. Field of the Invention

This invention relates generally to a portable or laptop computer and, more particularly, it relates to a portable or laptop computer assembly having an integrated printer device, a portable telephone, and a variety of peripheral devices.

2. Description of the Prior Art

Portable or laptop computers comprise the largest and fastest growing markets in the computer industry today. Portable computers typically include a keyboard, a liquid crystal display screen, an integral pointer device, e.g., a mouse, a touch pad, a joy stick, II etc., and a variety of peripheral devices including a hard disk drive, a floppy disk drive, and/or a CD ROM drive. In some instances, the floppy disk drive and the CD ROM drive are interchangeable within the portable computer such that the user of the portable computer must determine whether to use either the floppy disk drive or the CD ROM drive, but not both simultaneously.

In the past, there have been attempts to improve portable computers by incorporating faster processors and adding advanced peripherals, such as high capacity floppy disk drives, thereby increasing the performance and data capacity of the portable computers and decreasing the processing times of the data within the portable computer. Unfortunately, such improvements in portable computers have not overcome the inherent limitations regarding portable computer usage in which the user does not have the ability to access to all features similar to a standard desktop computer.

For instance, with conventional portable computers, a user is not able to fully complete work, documents, i.e., access other data, or send/receive data for processing, e.g., to access server or other programs and files, and print documents, while away from the user's home or office for minimal or extended periods of time. In many instances, in order to complete the work or other documents, the user requires more than simply typing the data or information into the portable computer and storing the data or information in the memory of the portable computer. Many users require the additional features of printing the typed data or information, faxing the data or information to a distant location, and/or printing data from real-time communications, i.e., from the internet or remote link to server or personal computer. Printers are typically too bulky, heavy, and power consuming for a portable computer user to carry a printer with him or her when traveling or away from the home or office. Furthermore, especially with the unreliability and incompatibility of cellular and/or satellite telephone connections and foreign telephone systems overseas, the user is not able to confidently electronically transfer valuable and essential information between countries.

In addition to the above, in many cases, the user is not able to access any telephone lines when in remote or foreign locations. In the case of poor telephone line connections, the small antenna on a typical cellular and/or satellite telephone does not generally allow the user to confidently connect with the proper services for sending or receiving data.

Furthermore, in many foreign locations, there are other incompatibilities between a U.S. laptop or portable computer and the variety of services available in the foreign locations. For instance, network systems may not be compatible thereby not allowing the laptop computer to be easily networked with other computers in the foreign locations, created documents are not easily reformatted for different paper sizes often available in the foreign locations, printer drivers for using external printers in the foreign locations may not compatible thereby prohibiting printing of documents stored on the laptop computer, etc.

Accordingly, there exists a need for a portable computer assembly which allows a user to complete work or other documents without the need for additional hardware. Additionally, a need exists for a portable computer assembly which directly incorporates a easily carryable printer device and a paper supply for the printer device for use with the portable computer system specifically designed for low power consumption. Furthermore, there exists a need for a portable computer assembly which directly incorporates a portable telephone, e.g., cellular, satellite, etc., for use with the portable computer system or separately as a normal portable telephone.

SUMMARY

The present invention is a portable computer assembly. The portable computer assembly of the present invention comprises a main outer casing and an operable computer system mounted within the outer casing with the computer system being powered by a power source. A cover lid is hingedly connected to the main outer casing with the cover lid being rotatable in a direction generally toward the main outer casing and in a direction generally away from the main outer casing. A display device is mounted within the cover lid for displaying data generated by the computer system. A paper supply device retains a predetermined number of individual sheets of paper and a printer device is securable to the computer system for receiving individual sheets of paper from the paper supply means and printing data received from the computer system upon the individual sheets of paper.

In an embodiment of the present invention, the power source is a battery pack mounted within the outer casing or an external power source.

In another embodiment of the present invention, the display means is a liquid crystal display device.

In still another embodiment of the present invention, the portable computer assembly comprises a portable telephone releasably secured to the main outer casing and electrically connected to the computer system with the portable telephone having a portable telephone antenna and a portable telephone battery pack. Preferably, the portable computer further comprises a portable telephone receiving, opening formed in the main outer casing for releasably receiving the portable telephone. Furthermore, preferably, the portable computer assembly further comprises an antenna mounted within the cover lid adjacent the display means with the antenna electrically connected to the portable telephone antenna when the portable telephone is releasably received within the portable telephone receiving opening. Additionally, preferably, the portable computer assembly further comprises a shield positioned within the cover lid adjacently between the antenna and the display means.

In yet another embodiment of the present invention, the portable computer assembly further comprises electrical contacts within the portable telephone receiving opening for electrically connecting the portable telephone battery pack of the portable telephone to the power source of the computer system and electrically connecting the portable telephone to the computer system.

In still yet another embodiment of the present invention, the main outer casing has an access cover for mounting a keyboard and a pointing device. Preferably, the computer system further includes PCBA components mounted within the main casing adjacently beneath the keyboard with the PCBA components controlling the function of the computer system, the paper supply means, the printer means, and receptacles for memory PCBAs. Furthermore, preferably, the computer system includes various hardware components selected from the group consisting a CD ROM drive, a floppy disk drive, a hard disk drive, a PCMCIA card drive, and any new peripherals. Additionally, preferably, the portable computer assembly further comprises a shield mounted between the PCBA components and the various hardware components.

In another embodiment of the present invention, the paper supply means is a paper tray, the paper tray slidable into and out of the main outer casing.

In still another embodiment of the present invention, the portable computer assembly further comprises paper feeding means contacting an individual sheet of paper for feeding the individual sheets of paper into the printer means.

In yet another embodiment of the present invention, the printer means is a printer device selected from the group consisting of an inkjet printer and a laser printer. Preferably, the inkjet printer has replaceable color and black and white ink cartridges and the laser printer has replaceable toner cartridges.

The present invention further includes a portable computer assembly comprising a main outer casing and an operable computer system mounted within the outer casing with the computer system powered by a power source. A cover lid hingedly is connected to the main outer casing with the cover lid rotatable in a direction generally toward the main outer casing and in a direction generally away from the main outer casing. A display device is mounted within the cover lid for displaying data generated by the computer system. A portable telephone is releasably secured to main outer casing and electrically connected to the computer system.

In an embodiment of the present invention, the portable computer assembly further comprises a portable telephone receiving opening formed in the main outer casing for releasably receiving the portable telephone. Preferably, the portable computer assembly further comprises an antenna mounted within the cover lid adjacent the display means with the antenna electrically connected to a portable telephone antenna on the portable telephone when the portable telephone is releasably received within the portable telephone receiving opening. Furthermore, preferably, the portable computer assembly further comprises electrical contacts within the portable telephone receiving opening for electrically connecting a portable telephone battery pack of the portable telephone to the power source of the computer system and electrically connecting the portable telephone to the computer system.

In another embodiment of the present invention, the portable computer system further comprises paper supply means within the main outer casing for retaining a predetermined number of individual sheets of paper, and further comprises printer means securable to the computer system for receiving individual sheets of paper from the paper supply means and printing data received from the computer system upon the individual sheets of paper. Preferably, the paper supply means is a paper tray, the paper tray slidable into and out of the main outer casing. Furthermore, preferably, the portable computer assembly further comprises paper feeding means contacting an individual sheet of paper for feeding the individual sheets of paper into the printer means.

DETAILED DESCRIPTION OF THE PREFERRED EMBODIMENTS

Figure 1:
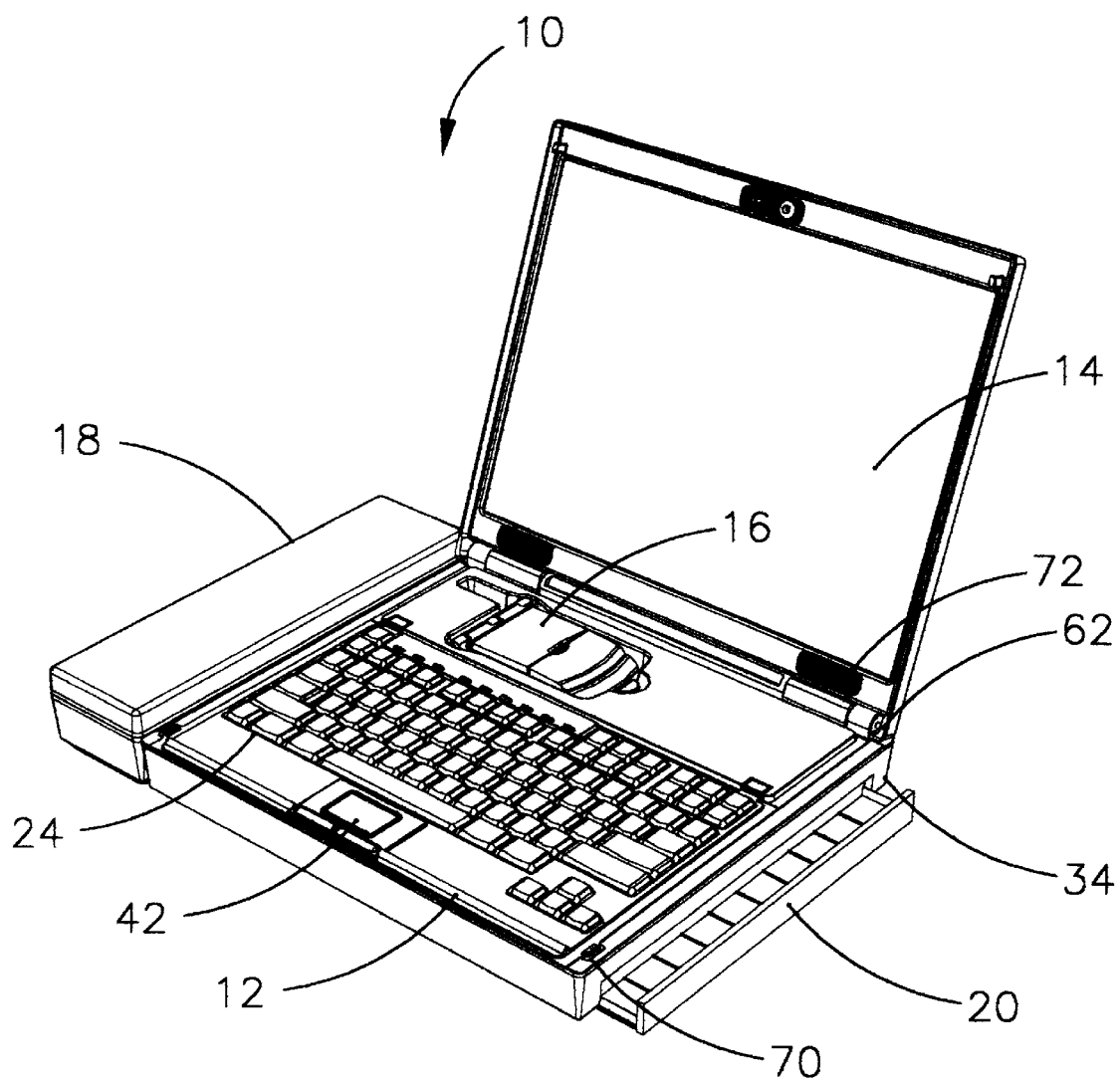
FIG. 1 is a perspective view illustrating a portable computer assembly constructed in accordance with the present invention, having a portable telephone releasably secured within a portable telephone receiving opening, a detachable printer device releasably secured to the portable computer assembly, and a paper tray for holding a supply of paper for the printer device.

As illustrated in FIG. 1, the present invention is a portable computer assembly, indicated generally at 10, having a computer system 12, a monitor display device 14, a detachable portable telephone, e.g., a cellular telephone and/or satellite telephone 16 (hereinafter referred to as cellular telephone), a printer device 18, and a paper tray 20 for holding a supply of individual sheets of paper (not shown) and feeding the individual sheets into the printer device 18 for printing data associated with the computer system 12 on the individual sheets of paper. The computer system 12 generally includes a processing system, e.g., a Pentium processing system, and other PCBA components 22, a keyboard 24, and various computer hardware components including, but not limited to, a hard disk drive 26, a floppy disk drive 28, a CD ROM drive 28, a PCMCIA drive 30 for receiving PCMCIA cards 32, etc. It should be noted that while the processing system has been described as a Pentium processing system, it is within the scope of the present invention to have the processing system be any type of processing system which allows the portable computer assembly 10 to process data and information.

Figure 5:
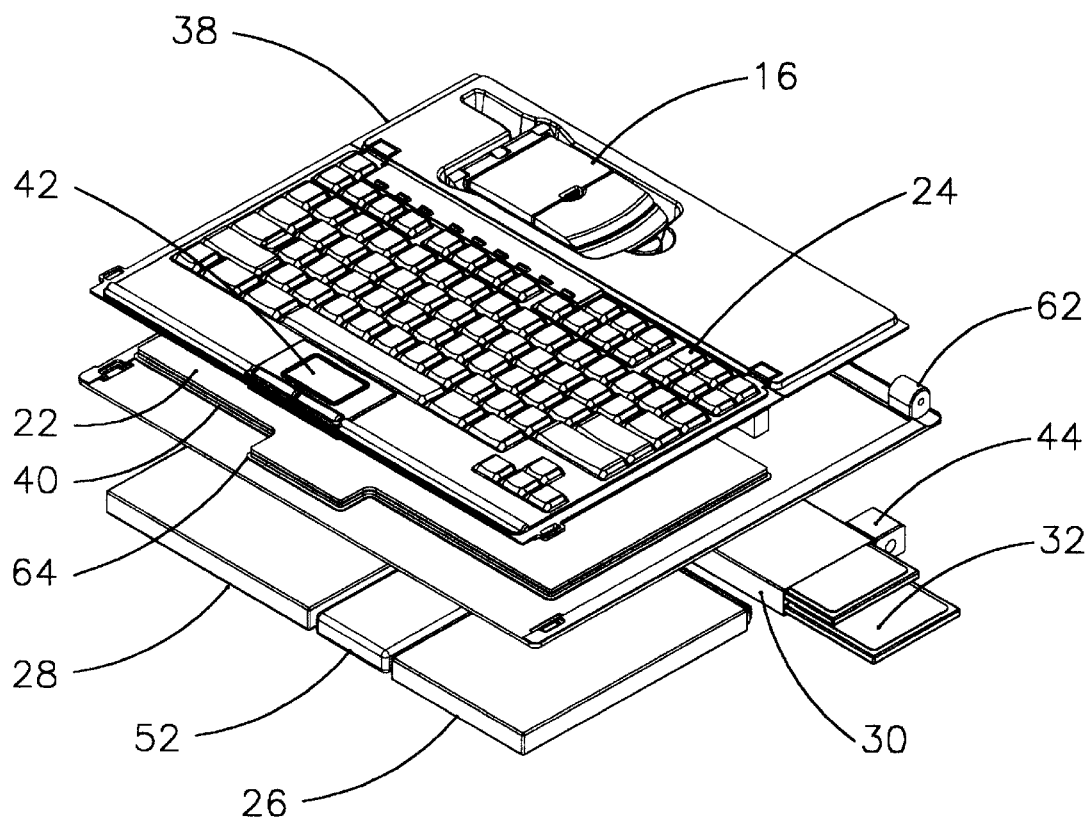
FIG. 5 is an exploded perspective view illustrating the keyboard and drive arrangement of the portable computer assembly of FIG. 1, constructed in accordance with the present invention.

The computer system 12 of the portable computer assembly 10 of the present invention includes an outer casing 34 enclosing the processing system, PCBA components, and the various computer hardware components therein and a closable lid 36 rotatable in a direction generally toward and away from the outer casing 34 depending on whether the user is using the portable computer assembly 10 or whether the user is transporting or storing the portable computer assembly 10. As illustrated in FIG. 5, the outer casing 34 includes an access cover 38, the PCBA components 22 including, but not limited to the processing system, for controlling the operation of the portable computer assembly 10, and a PCBA shield 40 for electronically shielding the processing system and other PCBA components from the heat magnetic, and/or electrical interference generated by the operation of the various computer hardware components. Each of the above-identified elements of the portable computer assembly 10 within the outer casing 34 will now be described in further detail.

The removable access cover 38 includes the keyboard 24 positioned or formed therein for access by the manufacturer or repair technician for set-up and repair, such as memory add-ons, accessing, changing and/or repairing the peripherals, etc. The keyboard 24 can be a compact personal computer keyboard typically found on conventional portable computers or can be a custom size keyboard, depending on the needs and desires of the manufacturer and/or user and the size of keyboard 24 which can fit within the portable computer assembly 10. Furthermore, a completely functional pointing device 42, e.g., a mouse, a touch pad, a trackball, a joystick, etc., can be positioned adjacent the keyboard 24 to augment the user's ability to use the portable computer assembly 10. An external pointing device (not shown) can also be connected to the portable computer assembly 10 through an appropriate connection 44 to the portable computer system 10.

The access cover 38 further includes a cellular telephone receiving opening 46 for receiving the cellular telephone 16 in a snap-fit type or the like manner. The cellular telephone receiving opening 46 is preferably sized and shaped substantially equal to the size and shape of the cellular telephone 16 thereby securely releasably maintaining the relative position of the cellular telephone 16 within the cellular telephone receiving opening 46. The cellular telephone 16 can be a compact flip style cellular telephone which preferably includes a cellular telephone battery pack 48 and a cellular telephone antenna 50 and is operable by the user when either detached from the portable computer assembly 10 or seated within the cellular telephone receiving opening 46 formed in the outer casing 34.

Figure 3:
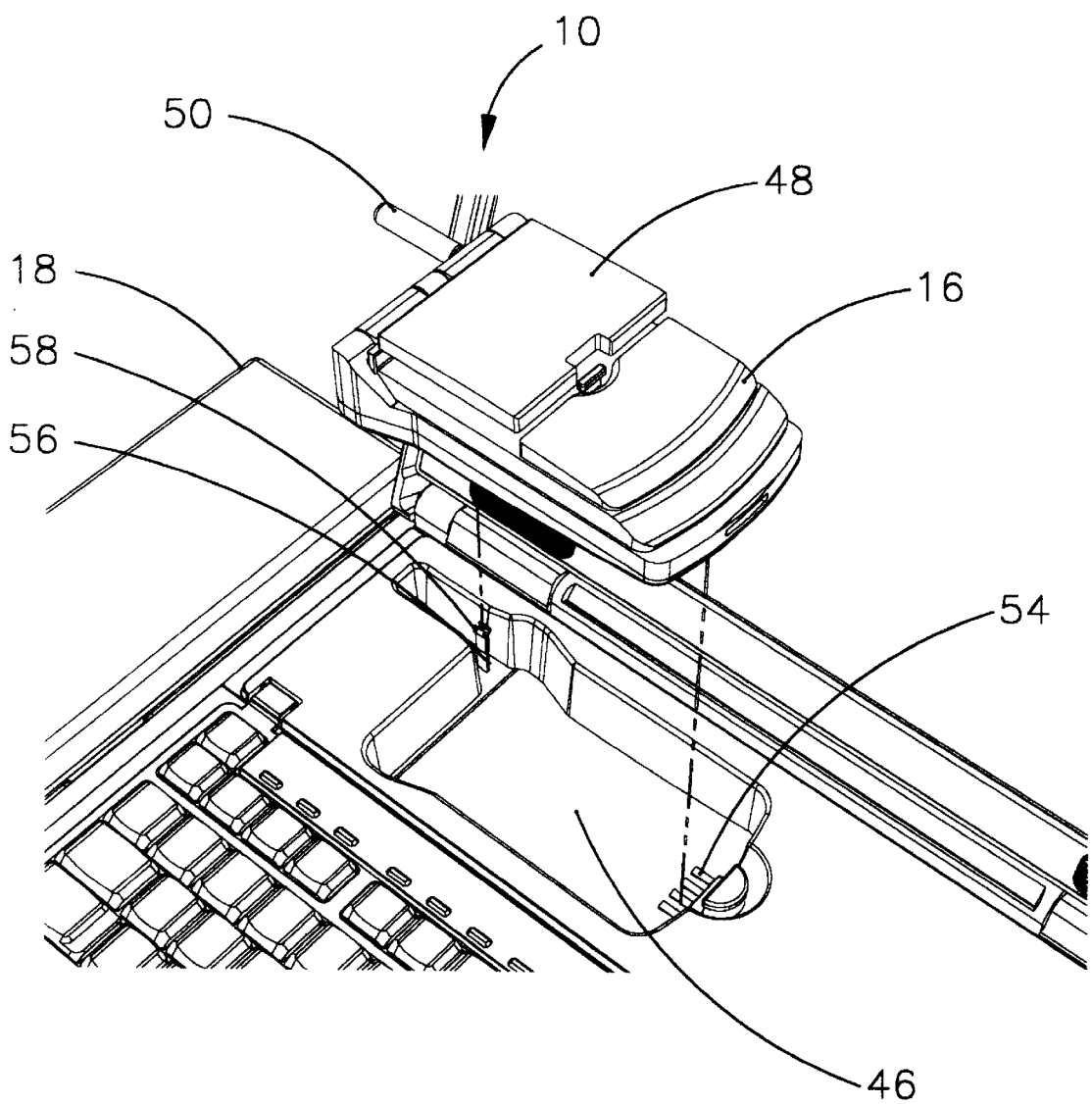
FIG. 3 is a perspective view illustrating the portable telephone and the portable telephone receiving area of the portable computer assembly, constructed in accordance with the present invention.

As illustrated in FIG. 3, the cellular telephone receiving opening 46 includes at least one contact 54 electrically connected to a battery pack 52 (as illustrated in FIG. 5) within the portable computer assembly 10 of the present invention. The contacts 54 allow the cellular telephone 16 to be recharged during non-use of the cellular telephone 16 thereby insuring sufficient power for the cellular telephone 16 when used by the user of the portable computer system 10. Additionally, the contacts 54 allow the cellular telephone 16 to be powered by the power source of the computer system 12 when the cellular telephone 16 is used by the user. It should be noted that the cellular telephone 16 is preferably powered by a battery pack within the cellular telephone except when the cellular telephone battery pack has low power then the computer system power source or external power source powers the cellular telephone 16. Furthermore, the contacts 54 connect the antenna 50 of the cellular telephone 16 with the computer system antenna 60 and connects the signals processed by the cellular telephone 16 to the computer system 12, as will be described in further detail below.

Figure 4:
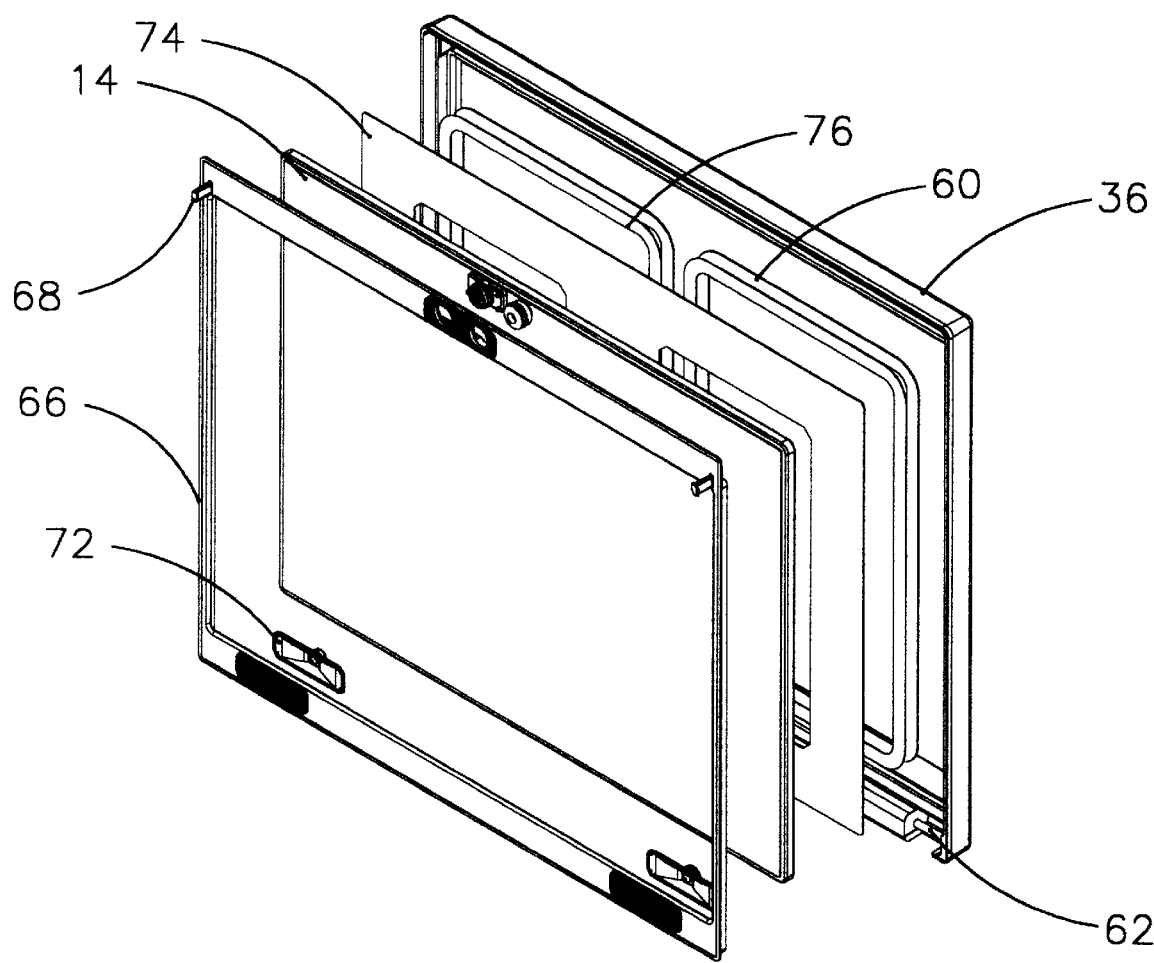
FIG. 4 is an exploded perspective view illustrating the display device of the portable computer assembly of FIG. 1, constructed in accordance with the present invention, having an antenna therein for the portable telephone.

The cellular telephone receiving opening 46 further includes an antenna connection 56 which contacts the cellular telephone antenna 50 of the cellular telephone 16 when the cellular telephone 16 is received within the cellular telephone receiving opening 46. The antenna connection 56 includes a protrusion 58 for releasably contacting the cellular telephone antenna 50 of the cellular telephone 16 and assisting in releasably maintaining the cellular telephone 16 in the cellular telephone receiving opening 46. Furthermore, the antenna connection 56 connects to a computer system antenna 60 (as illustrated in FIG. 4) either attached to or molded into the closable lid 36 for providing a better signal between the cellular telephone 16 and a local cellular telephone tower (not shown) or satellite (not shown). The computer system antenna 60 in the closable lid 36 will be discussed in further detail below.

Now referring back to FIG. 5, the PCBA components 22 are mounted directly under the access cover 38 nearingly adjacent the keyboard 24 and the pointing device 42. A PCBA shield 40 is then positioned adjacent, under, and/or over the PCBA components 22 to shield the PCBA components 22 from heat, magnetic, and electrical interference generated by the various computer hardware components positioned beneath the PCBA shield 40. The PCBA shield 40 will shield the components of the portable computer system 10 as necessary, e.g., above, below, or around the PCBA components.

The various computer hardware components include, but are not limited to, the CD ROM/floppy disk drive 28, the rechargeable battery pack 52, the hard disk drive 26, and a the PCMCIA drive 30 for receiving at least one PCMCIA card 32. The PCBA components 22 controls the functions of the portable computer system 10 including, but not limited to, the operation of the keyboard 24, the pointer device 42, the cellular telephone 16, the printer device 18, the paper tray 20, the various computer hardware components, an external printer (not shown), I/O ports (similar to those I/O ports found on conventional desktop and laptop computers, i.e., serial ports, parallel ports, video ports, etc., power management, memory management, etc. It should be noted that the arrangement and/or inclusion of certain computer hardware components can be different than illustrated depending on the needs and desires of the manufacturer and/or user.

The rechargeable battery pack 52 of the computer system 12 is preferably, but not necessarily, an extended life battery to power the functions of the computer system 12, the printer device 18, the paper tray 20, the cellular telephone 16, etc., when external power is not available. In a preferred embodiment, the inventor of the present invention envisions the battery pack 52 having a life of approximately three (3) to approximately four (4) hours with mostly computer use and a life of approximately one (1) to approximately two (2) hours with computer use and intermittent printer device use. These approximate time limits are merely estimates of battery pack life and could be increased depending on the size, type, and capacity of the battery pack 52.

The PCBA shield 40 includes a cover hinge 62 for hingedly connecting the PCBA shield 40 to the outer casing 34. A handle 64 on the PCBA 40 shield facilitates the lifting and rotation of the PCBA shield 40 about the cover hinge 62 to provide access to the manufacturer to the various computer hardware components positioned within the outer casing 34 under the PCBA shield 40. Additionally, it is within the scope of the present invention to mount certain hardware components, i.e., the floppy/CD ROM drive 28, through the side of the outer casino 34 in order to provide access to the user to the various hardware components. Furthermore, it is further within the scope of portable computer assembly 10 of the present invention to include mounting at least one of the various computer hardware components, e.g., the hard disk drive 26, the floppy disk drive 28, etc., in the closable lid 36.

As illustrated in FIG. 1, the closable lid 36 is hingedly attached to the outer casing 34 through the cover hinge 62 thereby allowing the closable lid 36 to move into a closed position generally toward the keyboard 24 thereby inhibiting damage to both the keyboard 24 and the display device 14 during non-use of the portable computer assembly 10 such as during transport and storage of the portable computer assembly 10 and into an open position away in a direction generally away from the keyboard 24 during use of the portable computer assembly 10. As illustrated in FIG. 4, the closable lid 36 includes an outer cover 66 including at least one bezel latch 68 which is receivable within a bezel latch opening 70 (see FIG. 1) formed in the outer casing 34 for releasably securing the closable lid 36 in the closed position. At least one speaker 72 can also be mounted within the closable lid 36 for appropriate use with the portable computer system 10 of the present invention.

The display device 14 is preferably mounted behind the outer cover 66 of the closable lid 36 for the user to view during use of the portable computer assembly 10 of the present invention. The display device 14 is preferably a liquid crystal display having a low profile packaging with inverter and a color active matrix of 640×480 and 1024×768. Furthermore, the display device 14 can be of any size with the preferably size having a horizontal dimension equal to or less than thirteen (13") inches. While the type and size of the display device 14 has been described immediately above, a person skilled in the art will understand that any type and size of display device 14, i.e., any commercially available display device or custom designed display device, can be incorporated into the portable computer assembly 10 of the present invention.

A shield 74 is positioned behind the display device 14 for shielding the display device 14 from interference generated from the antenna 60 of the computer system 12 positioned under the shield 74 within the closable lid 36. Preferably, the antenna 60 includes an insulative covering material 76 for further inhibiting electrical and/or magnetic interference with the display device 14 during use of the portable computer assembly 10 of the present invention.

Figure 2:
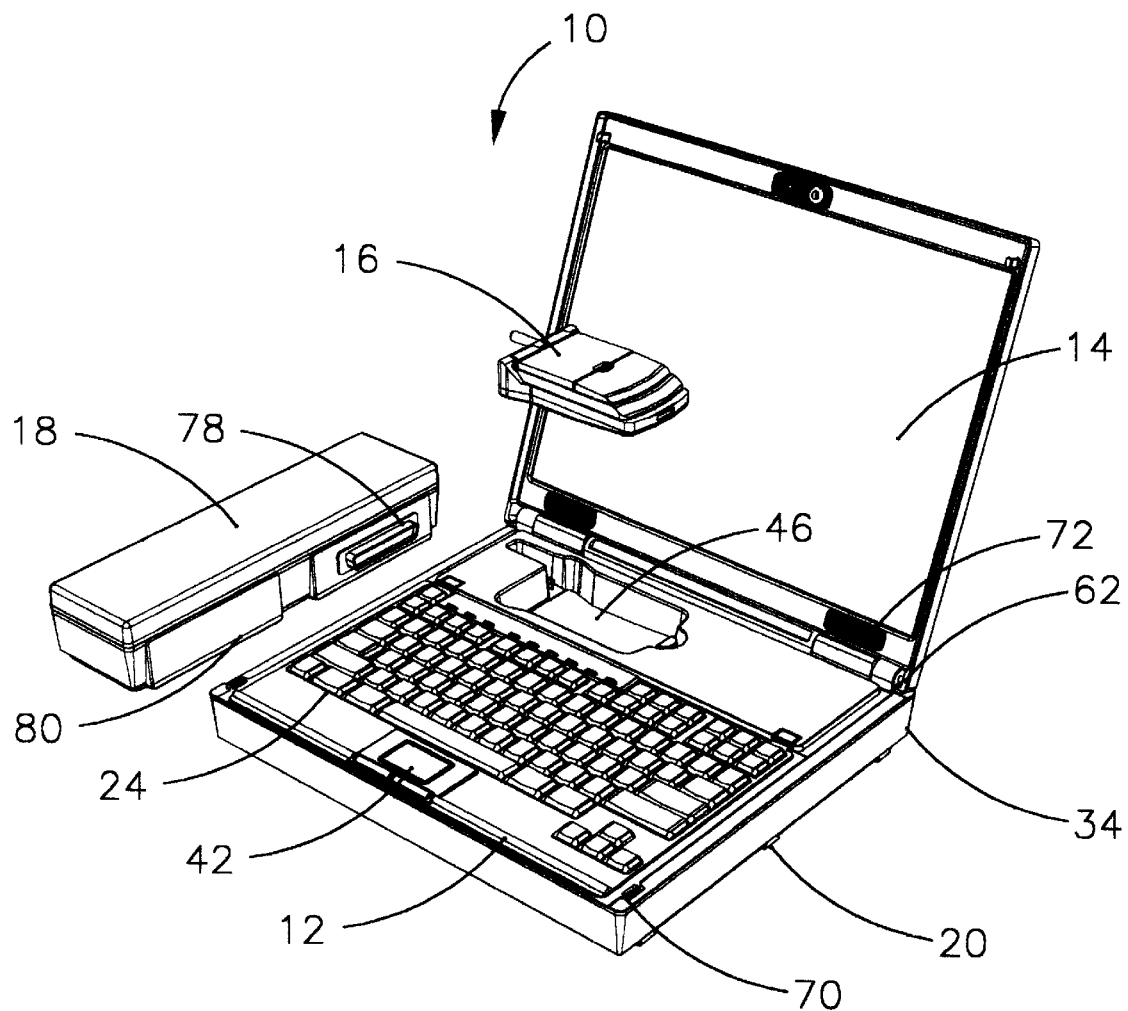
FIG. 2 is a perspective view illustrating the portable computer assembly of FIG. 1, constructed in accordance with the present invention, with the portable telephone removed from the portable telephone receiving opening and the printer device detached from the portable computer assembly.

As illustrated in FIGS. 1 and 2, the portable computer assembly 10 of the present invention includes the printer device 18. The printer device 18 can either be detachable from or integrated into the outer casing 34 of the computer system 12 and is functionally equivalent to the conventional printers used with desktop-type personal computers. The printer device 18 includes all the necessary components for printing data and other information onto individual sheets of paper directly from data and information generated and/or stored in the portable computer system 10. Furthermore, the printer device 18 can print faxes received or data accessed remotely via modem or the internet over the cellular telephone 16 or land telephone lines.

The printer device 18 of the portable computer system 10 of the present invention can be selected from a variety of printer devices including, but not limited to, either a laser printing device (either color or black and white), an inkjet printing device (either color or black and white), or a thermal printing device, depending on the desires of the user. In fact, the user can have both a laser printing device and an inkjet printing device which can be interchanged onto the portable computer system 10 depending on the needs and desires of the user. However, with a laser printing device, it is within the scope of the present invention to have a removable interchangeable toner cartridge (either color or black and white), and with an inkjet printing device, it is within the scope of the present invention to have removable interchangeable ink cartridges (either color or black and white) thereby allowing the user to determine the types of printing desired by the printer device 18.

In a preferred embodiment, the inventor of the present application envisions the printer device 18 having a printing speed between approximately one (1) page per minute and approximately two (2) pages per minute when powered by the battery pack 52. It is within the scope of the present invention, however to provide a printer device 18 having print speeds greater than between approximately one (1) page per minute and approximately two (2) pages per minute. In fact, when powered by an external power source, print speeds can be considerably greater, i.e., seven (7) pages per minute or more.

The printer device 18 has a power and signal connector 78 for electronically connecting the printer device 18 to the PCBA components 22 of the computer system 12 within the outer casing 34. The PCBA components 22 include the necessary software and firmware, such as print drivers, to control the operation and function of the printer device 18 for allowing the user to print documents, information, and the like from the portable computer assembly 10. Additional drivers can be downloaded in a conventional manner to connect the printer device 18 to other printers on a network or to connect networked computers to the printer device 18, all of which can be connected through an I/O port on the back panel of the outer casing 34.

As described above, the printing device 18 is detachable from the outer casing 34 such that the user can store, carry, and/or use the portable computer assembly 10 without the printing device 18. To accomplish this, either the printing device 18 or the outer casing 34 are provided with at least one prong (not shown) or the like which are releasably securably receivable within apertures (not shown) in the outer casing 34 or the printing device 18, respectively. A release mechanism (not shown) can be provided to release the prongs from the apertures when desired thereby releasing the printing device 18 from the outer casing 34. Furthermore, the power and signal connector 78 further acts to releasably secure the printing device 18 to the outer casing 34.

While the printing device 18 has been described as being detachable from the portable computer system 10, it is within the scope of the present invention to have the printing device be mounted within the outer casing 34. In such case, the power and signal connector 78 would typically be a flexible connector (not shown) mounted to the PCBA board 22.

The printer device 18 can have its own separate rechargeable power source, e.g., a printer device battery pack, or the printer device 18 can be powered by the rechargeable battery pack 52 within the computer system 12. If the printer device 18 is detachable from the outer casing 34, it would be beneficial to have a separate power source for the printer device 18 and a separate power source for the computer system 12 thereby removing additional weight from the computer system 12 when the printer device 18 is detached. The power source can be a rechargeable printer device battery pack releasably secured within the printer device 18. Of course, the printer device 18 and the computer system 12 can be powered by any type of power source including, but not limited to, electrical AC, etc. From an external power source, the power for the printer device 18 is routed first through the portable computer assembly 10 and then to the printer device 18.

The paper tray 20 of the portable computer assembly 10 of the present invention is slidably incorporated into the outer casing 34 for holding a supply of individual sheets of paper and feeding the individual sheets of paper into the printer device 18 for the imprinting of data or other information thereon. The paper tray 20 can hold a predetermined amount of sheets of paper, e.g., ten sheets, twenty sheets, fifty sheets, eighty sheets, etc., depending on the desires of the manufacturer and/or the user.

As illustrated in FIG. 1, the individual sheets of paper are loaded into the paper tray 20 by first sliding the paper tray 20 from the outer casing 34. The paper tray 20 is then slidably positioned back within the outer casing 34. The data and/or information from the computer system 12 is then imprinted onto the individual sheets of paper as the paper moves through the printer device 18 and out of a paper expulsion slot (not shown) in the printer device 18.

Appropriate paper feeding mechanisms within the outer casing 34 feed individual sheets of paper into a paper receiving slot 80 in the printer device 18. When external power is applied, the print head (not shown) within the printer device 18 is driven by the electrical circuit. When battery driven, the user has the option to use a mechanical paper feed device, e.g., a wind-up type device. It should be noted that the printer device 18 can also have a single sheet feed, as desired.

Figure 6:
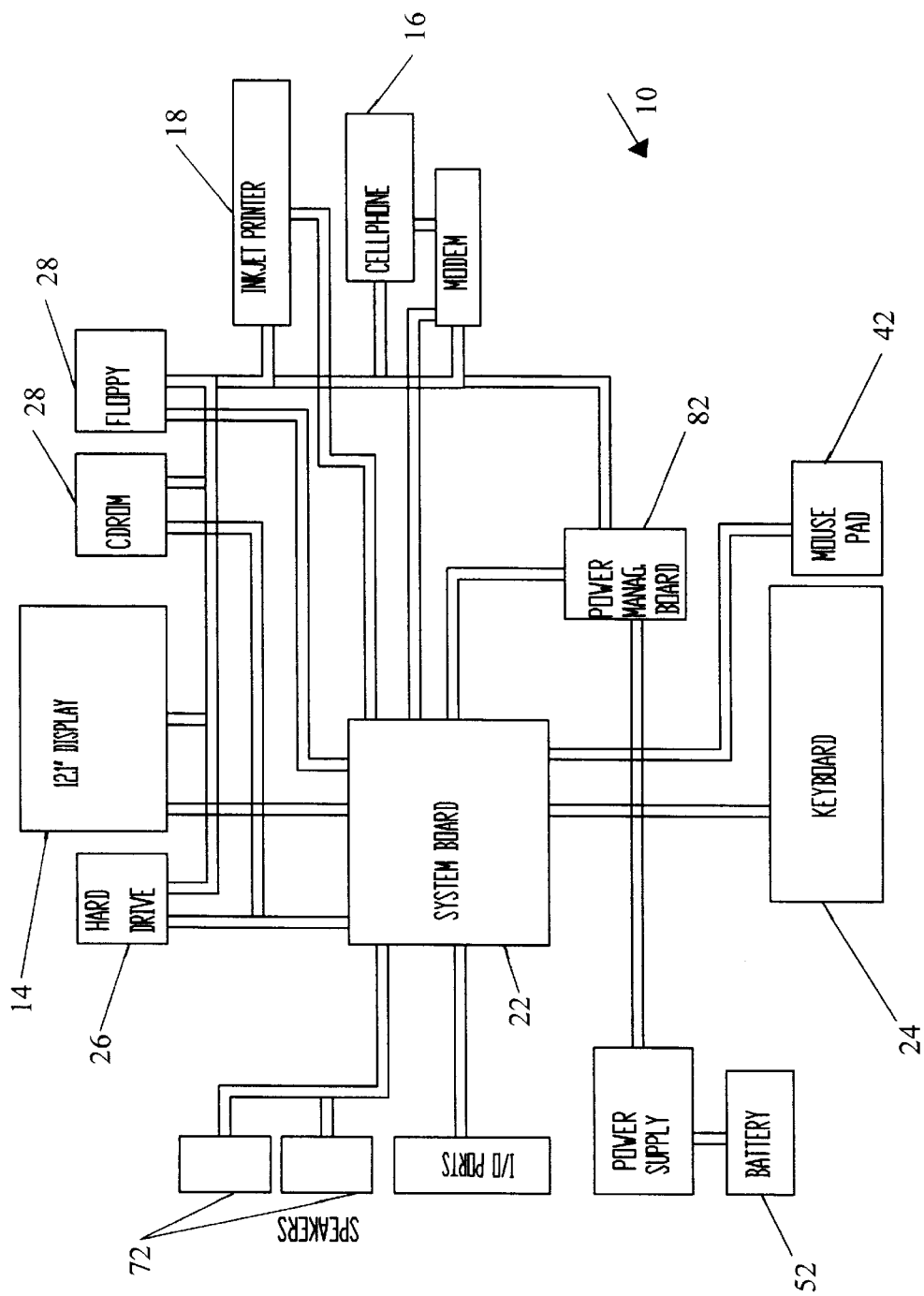
FIG. 6 is a block diagram illustrating the portable computer assembly of FIG. 1, constructed in accordance with the present invention.

As illustrated in FIG. 6, the portable computer assembly 10 of the present invention includes a power management system 82 to power up and power down the various hardware components and the printer device 18 of the portable computer assembly 10 as commands are given to the computer system 12 either automatically or from the user. Furthermore, preferably, the power management system 82 powers up and down the display device 14, the printer device 18, the cellular telephone 16, various peripheral devices, and individual computer chips on the PCBA board. Preferably the power management system 82 is incorporated into the PCBA components 22 as either firmware or software.

Additionally, the portable computer assembly 10 of the present invention can include an LCD monitoring display (not shown) on the outer casing for providing information, e.g., battery status, power on status, speaker status, etc., to the user of the portable computer assembly 10.

Furthermore, the portable computer assembly 10 of the present invention can include a telephone jack (not shown) for connecting a land telephone line to the portable computer assembly 10. Upon connection with a land telephone line, the operation of the cellular telephone 16 can be overridden either automatically by the computer system 12 or manually by the user.

The portable computer assembly 10 of the present invention further includes customized or conventional software to handle telephone messaging, facsimiles, internet connections, etc. Also the software can control the switching/setting between the regular telephone lines and the cellular telephone, as needed.

The novel portable computer assembly 10 of the present invention ties together the computer system 12, the display device 14, the integrated cellular telephone 16, the fax/modem, and the printer device 18. The portable computer assembly 10 creates a lightweight/small package and low cost system that is comparable in size and price to the conventional portable computer. The cost of the portable computer assembly 10 of the present invention maintains a lower cost due to the lower cost of the add-on components. For instance, the addition of the cellular telephone 16 and the printer device 18 increases the cost by only between approximately five (5%) percent and ten (10%) percent.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A portable computer assembly comprising:
   a main outer casing;
   an operable computer system mounted within the outer casing, the computer system powered by a power source;
   a cover lid hingedly connected to the main outer casing the cover lid rotatable from a closed position adjacent the main outer casing to an opened position at least substantially perpendicular to the main outer casing;
   display means mounted within the cover lid for displaying data generated by the computer system;
   printer means securable to the main outer casing and communicating with the computer system, the printer means for receiving individual sheets of paper and printing data received from the computer system upon the individual sheets of paper and operable with the cover means in any position between and including the closed position and the opened position; and
   paper feed means for feeding at least one sheet of paper into the printer means.

2. The portable computer assembly of claim 1 wherein the power source is a battery pack mounted within the outer casing, the battery further powering the printer means.

3. The portable computer assembly of claim 1 wherein the display means is a liquid crystal display device.

4. The portable computer assembly of claim 1 and further comprising:
   a portable telephone releasably secured to the main outer casing and electrically connected to the computer system, the portable telephone having a portable telephone antenna and a portable telephone battery pack.

5. The portable computer assembly of claim 1 wherein the main outer casing has an access cover for mounting a keyboard and a pointing device.

6. The portable computer assembly of claim 1 and further comprising:
   paper supply means within the main outer casing for retaining a predetermined number of individual sheets of paper, the paper feed means delivering individual sheets of paper from the paper supply means to the printer device.

7. The portable computer assembly of claim 1 wherein the printer means is a printer device selected from the group consisting of an inkjet printer, a laser printer, and a thermal printer.

8. The portable computer assembly of claim 4 and further comprising:

a portable telephone receiving opening formed in the main outer casing for releasably receiving the portable telephone.

9. The portable computer assembly of claim 8 and further comprising:

an antenna mounted within the cover lid adjacent the display means, the antenna electrically connected to the portable telephone antenna when the portable telephone is releasably received within the portable telephone receiving opening.

10. The portable computer assembly of claim 8 and further comprising:

electrical contacts within the portable telephone receiving opening for electrically connecting the portable telephone battery pack of the portable telephone to the power source of the computer system and connecting the signals processed by the portable telephone to the computer system.

11. The portable computer assembly of claim 5 wherein the computer system includes PCBA components mounted within the outer casing adjacently beneath the keyboard, the PCBA components controlling the function of the portable computer assembly.

12. The portable computer assembly of claim 5 wherein the computer system includes various hardware components selected from the group consisting a CD ROM drive, a floppy disk drive, a hard disk drive, and a PCMCIA card drive.

13. The portable computer assembly of claim 6 wherein the paper supply means is a paper tray, the paper tray slidable into and out of the main outer casing.

14. The portable computer assembly of claim 9 and further comprising:

a shield positioned within the cover lid adjacently between the antenna and the display means.

15. The portable computer assembly of claim 7 wherein the inkjet printer has replaceable color and black and white ink cartridges and the laser printer has replaceable color and black and white toner cartridges.

16. The portable computer assembly of claim 12 and further comprising:

a shield mounted between the PCBA components and the various hardware components.

17. A portable computer assembly comprising:

a main outer casing;

an operable computer system mounted with the outer casing the computer system powered by a power source;

a cover lid hingedly connected to the main outer casing, the cover lid rotatable in a direction generally toward the main outer casing and in a direction generally away from the main outer casing;

display means mounted within the cover lid for displaying data generated by the computer system;

a portable telephone releasably secured to main outer casing and electrically connected to the computer system; and an opening formed in the main outer casing for releasably receiving the portable telephone.

18. The portable computer assembly of claim 17 and further comprising an antenna mounted within the cover lid adjacent the display means, the antenna electrically connected to a portable telephone antenna on the portable telephone when the portable telephone is releasably received within the opening.

19. The portable computer assembly of claim 17 and further comprising electrical contacts within the portable telephone receiving opening for electrically connecting a portable telephone battery pack of the portable telephone to the power source of the computer system and connecting the signals processed by the portable telephone to the computer system.

20. The portable computer system of claim 17 and further comprising printer means securable to the computer system for receiving at least one sheet of paper and printing data on each individual sheet of paper.

21. The portable computer assembly of claim 20 and further comprising paper supply means within the main outer casing for retaining a predetermined number of individual sheets of paper for printing by the printer means.

22. The portable computer assembly of claim 21 wherein the paper supply means is a paper tray the paper tray slidable into and out of the main outer casing.

23. The portable computer assembly of claim 21 and further comprising paper feeding means contacting an individual sheet of paper for feeding the individual sheets of paper into the printer means.

24. A portable computer assembly comprising:

a main outer casing;

an operable computer system mounted within the outer casing, the computer system powered by a power source;

a cover lid hingedly connected to the main outer casing, the cover lid rotatable in a direction generally toward the main outer casing and in a direction generally away from the main outer casing;

display means mounted within the cover lid for displaying data generated by the computer system;

printer means releasably secured to the main outer casing for receiving individual sheets of paper and printing data received from the computer system upon the individual sheets of paper; and paper feed means for feeding at least one sheet of paper into the printer means;

wherein the computer system and the display means are completely operable upon release of the printer means from the main outer casing.

* * * * *